May 30, 1939.  G. B. BANKS  2,160,052
ELECTRICAL OSCILLATION GENERATOR
Filed July 24, 1936
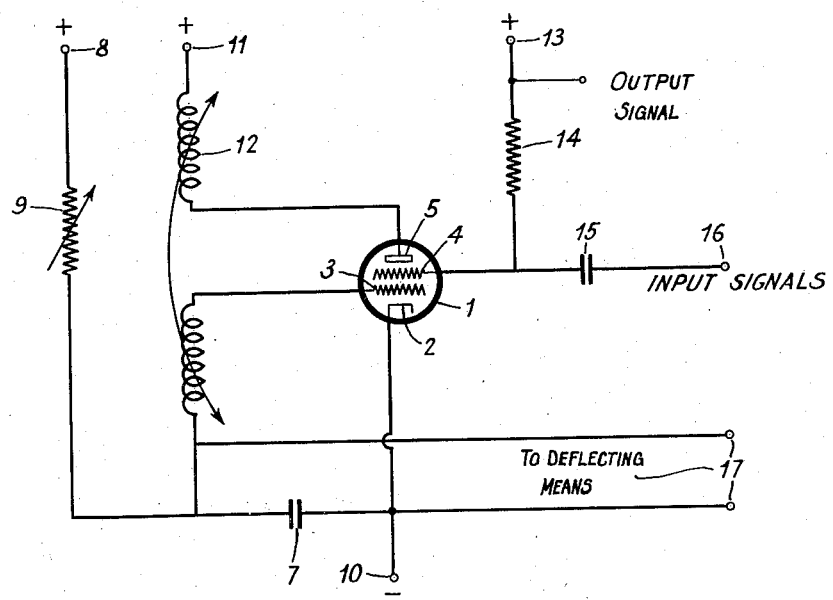
INVENTOR
G. B. BANKS
BY
ATTORNEY Patented May 30, 1939

2,160,052

UNITED STATES PATENT OFFICE 2,160,052

ELECTRICAL OSCILLATION GENERATOR

George Baldwin Banks, London, England, assignor to Radio Corporation of America, a corporation of Delaware Application July 24, 1936, Serial No. 92,322
In Great Britain August 2, 1935

2 Claims. (Cl. 250—36)

This invention relates to electrical oscillation generators and more particularly to generators for generating saw-tooth or substantially saw-tooth electrical waves suitable for use for producing scanning deflection of the cathode ray in a cathode ray tube television or like apparatus.

The invention seeks to provide improved saw-tooth electrical wave generators capable of being accurately synchronised by applied synchronising signals of very small amplitude; capable of producing saw-tooth wave forms of good accuracy, i. e., of substantially rectilinear outline; capable of producing also substantially square topped negative pulses suitable for use for cutting off the cathode ray in a cathode ray tube television or like apparatus during "fly-back" periods i. e., the periods between scanning lines and between picture frames; and which shall be of very simple and cheap construction.

According to this invention an electrical wave generator comprises a thermionic tube oscillator circuit arrangement wherein the oscillator tube is a thermionic tube of the screen grid type, a condenser connected in circuit in such manner as to receive a negative charge as a result of grid current occurring in said oscillator tube when it is oscillating, said condenser being also so connected that when it has acquired a predetermined negative charge the voltage set up thereacross causes the tube to cease to oscillate, and a leak circuit for causing the negative charge on said condenser to disappear at a predetermined rate. Hereinafter the thermionic tube will be referred to merely as a tube. The negative charging of the condenser is very rapid and represents the "fly-back" period of the generator, and the arrangement is such that when this negative charge has been reduced to about zero, the tube again oscillates and the condenser is again negatively charged rapidly so that the next "fly-back" period occurs. Synchronising signals are applied to the screen grid of the tube to "trigger" the action, the "timing" of the whole arrangement, relative to the periodicity of the synchronising signals, being such that said synchronising signals control the frequency of the saw-tooth waves generated.

By the expression "tube of the screen grid type", as employed in the preceding paragraph, is meant a tube having a cathode, an anode, a control grid between the cathode and the anode, and a screen or additional grid between the control grid and the anode. The tube may in addition have other electrodes but the electrodes just mentioned are those essential to the operation of this invention.

The invention is illustrated in the accompanying drawing which shows diagrammatically one form of generator in accordance with the said invention and suitable for use for providing either saw-tooth voltage waves for electrostatically deflecting the cathode ray in a television or like cathode ray tube apparatus or square topped pulses.

Referring to the drawing there is employed a tube 1 having a cathode 2 which may be either a filament or of the indirectly heated type, a control grid 3, a screen grid 4 and an anode 5. The control grid circuit of the tube extends from the control grid 3 through a grid coil 6 and then through a storage condenser 7 in series therewith to the cathode. This condenser is connected to the positive terminal 8 of a source (not shown) of potential, for example of 240 volts, through a resistance 9 which may be and is preferably adjustable. The negative terminal 10 of this source of potential is connected to the cathode of the valve and is common with the negative terminal of a source (also not shown but which may be part of the first mentioned source of potential) of anode potential for the tube. The positive terminal 11 of the source of anode potential which may, for example, be one of 80 volts, is connected to the tube anode 5 through a coil 12 which is inductively coupled to the grid coil 6. This inductive coupling may, if desired, be adjustable. Suitable positive bias, for example a bias of +40 volts, is applied via a terminal 13 to the screen grid 4 of the tube through a resistance 14. Synchronising signals are applied via terminal 16 to the screen grid 4 of the tube through a suitable coupling condenser 15.

With this arrangement output voltage waves of substantially rectilinear saw-tooth wave shape may be taken at 17 from the terminals of the storage condenser 7 and the synchronising signals applied to the screen grid 4 of the tube may be quite small in amplitude, in fact in experimental practice satisfactory operation with applied synchronising signals of only 1/50 volt has been obtained. Another advantage of the arrangement lies in the fact that the synchronising circuit is distinct from the storage condenser-adjustable resistance circuit 7—9 and is in effect only electronically coupled thereto, this fact enabling a very accurate shape of saw-tooth wave to be obtained. Furthermore, the circuit will produce square topped negative pulses in the screen grid circuit and these pulses are suitable for use to suppress the cathode ray beam in a television or like cathode ray tube apparatus during so-called "fly-back" periods, i. e., during the short periods when the storage condenser is being negatively charged by grid current.

When the tube is non-conducting, there naturally will be no screen grid current flowing. As the charge on condenser 7 leaks away and tends to be compensated by the charging action of direct potential 8, the tube will begin to conduct. Hence, the screen grid will begin to draw current. Now, due to the inductive action between the inductance of the anode circuit and that of the control grid circuit, the potential of the plate will increase to a great extent, and since the screen grid is not subject to this inductive action, the plate will draw off a portion of the electrons in accordance with this rapidly changing voltage. When the control grid allows the passage of a small current, the screen grid due to its superior potential will absorb a great deal of this current, and as the current increases due to the increasing positive potential on the control grid, the plate potential likewise increases so that the change in grid current is comparatively small. Now, when the control grid begins to swing more negative, a smaller flow of electrons is occasioned but, at the same time, the plate potential decreases and the screen grid will absorb the greater number of electrons until the tube is blocked and the screen current flows to zero. Hence, the screen grid current being subjected to very small changes, it may be said that the potential developed across resistor 14 is substantially flat topped or the entire wave is substantially square topped.

As is well known, in most cathode ray tube television systems, it is required to suppress the cathode ray during the "fly-back" periods. Such cathode ray suppression may be effected by connecting the screen grid of the tube employed in a circuit in accordance with this invention through a suitable condenser to the control electrode, e. g., the Wehnelt cylinder or grid of the cathode ray tube.

Where the invention is applied to cathode ray tube television transmitting apparatus, e. g., to apparatus of the kind wherein picture signals for transmission are obtained by means such as a so-called "Iconoscope" or by means of a so-called "electron camera" the negative pulses obtainable from the screen grid circuit of the tube in an arrangement in accordance with the said invention may, with advantage, be superimposed on the picture signals and transmitted therewith for synchronising purposes, for it will be obvious that these negative pulses will correspond in time with the periods of negative charging of the storage condenser, i. e., they will automatically occur exactly between the scan deflections.

Many cathode ray tube television systems involve the use of saw-tooth electrical waves (either current waves or voltage waves according as to whether electromagnetic or electrostatic deflection is used for the tube) for producing deflection both in the "line" and in the "frame" direction, the line frequency being much higher than the framing frequency. Circuit arrangements in accordance with this invention may be employed for producing the required saw-tooth waves for both purposes.

The voltage wave form produced by a circuit arrangement as hereinbefore described is a saw-tooth wave of highly accurate shape, i. e., the sides of the saw-tooth are substantially rectilinear, the side of each saw-tooth corresponding to the "fly-back" period being quite steep. In order that a saw-tooth current wave shall be forced through electro-magnetic deflecting coils of a cathode ray tube, a square topped wave component of voltage should (as known per se) be added to the saw-tooth voltage wave and such a square topped component may be generated and added in any manner known per se, e. g., by means of a resistance.

What I claim is:

1. An apparatus for producing potentials of a serrated wave form comprising a vacuum tube having cathode, anode, control, and screen electrodes, inductive means connected between the anode and cathode of said tube, inductive means connected between the control electrode and cathode of said tube and coupled to the first-named inductive means, electrical storage means connected directly to the cathode of the vacuum tube on one side and serially connected in the control electrode circuit of the tube, a variable resistor, a source of direct current electric potential, a series circuit including said variable resistor and said direct current source of electric potential connected across the electrical storage means, means for coupling a source of signal potentials to the screen electrode and a load circuit connected to the screen electrode.

2. The apparatus claimed in claim 1 comprising in addition a second load circuit connected to the cathode and to the terminal of the electrical storage means remote therefrom.

GEORGE BALDWIN BANKS.